United States Patent
Torazza et al.

(10) Patent No.: US 9,821,641 B2
(45) Date of Patent: Nov. 21, 2017

(54) BODYWORK OR CHASSIS COMPONENT FOR A MOTOR VEHICLE, PARTICULARLY A DOOR FOR A MOTOR VEHICLE

(71) Applicant: C.R.F. Societa Consortile per Azioni, Orbassano (Turin) (IT)

(72) Inventors: Luciano Torazza, Orbassano (IT); Rosanna Brun, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 15/349,146

(22) Filed: Nov. 11, 2016

(65) Prior Publication Data
US 2017/0166039 A1     Jun. 15, 2017

(30) Foreign Application Priority Data
Dec. 15, 2015    (EP) ................................ 15200225

(51) Int. Cl.
*E04C 2/54*    (2006.01)
*B60J 5/04*    (2006.01)
(Continued)

(52) U.S. Cl.
CPC .............. *B60J 5/0469* (2013.01); *B23K 26/32* (2013.01); *B23K 33/008* (2013.01);
(Continued)

(58) Field of Classification Search
CPC .......... B60J 5/0469; B60J 5/0483; F16B 5/08; B23K 26/32; B21D 39/021
See application file for complete search history.

(56) References Cited

U.S. PATENT DOCUMENTS

| | | | |
|---|---|---|---|
| 2011/0170946 A1 | 7/2011 | Schneegans et al. | |
| 2016/0009319 A1* | 1/2016 | Langendorf | ......... B21D 39/026 |
| | | | 296/191 |
| 2016/0263971 A1* | 9/2016 | Haselwanter | .......... B60J 5/0469 |

FOREIGN PATENT DOCUMENTS

| | | |
|---|---|---|
| DE | 102007002856 A1 | 7/2008 |
| EP | 0200997 A2 | 11/1986 |

(Continued)

OTHER PUBLICATIONS

European Search Report dated Jun. 20, 2016 for European Application No. 15200225.9, 4 pages.

*Primary Examiner* — Brian D Mattei
(74) *Attorney, Agent, or Firm* — RMCK Law Group, PLC (57) ABSTRACT

A bodywork or chassis component for a vehicle includes a first sheet having a first connection flange and a second sheet having a second connection flange, the first and second sheets being joined in correspondence of the respective first and second connection flanges. The first connection flange is a flange folded back towards the first sheet so as to define a valley with the first sheet. The second connection flange is overlapped to said first connection flange for an overlap length and it is at least in part joined to said first connection flange by a welding at that joins a perimeter edge of the second connection flange to a side of the first connection flange external with respect to said valley. The first and second connection flanges are parallel to one another in correspondence of the overlap length. The invention further includes a method for manufacturing of the aforementioned component.

9 Claims, 6 Drawing Sheets

(51) Int. Cl.
*F16B 5/08* (2006.01)
*B23K 26/32* (2014.01)
*B23K 33/00* (2006.01)
B23K 103/10 (2006.01)
B23K 101/00 (2006.01)
B23K 26/242 (2014.01)

(52) U.S. Cl.
CPC ............... *B60J 5/0483* (2013.01); *F16B 5/08* (2013.01); *B23K 26/242* (2015.10); *B23K 33/002* (2013.01); *B23K 2201/006* (2013.01); *B23K 2203/10* (2013.01)

(56) References Cited

FOREIGN PATENT DOCUMENTS

EP 0722807 A1 7/1996
EP 1952933 A1 8/2008

\* cited by examiner

BODYWORK OR CHASSIS COMPONENT FOR A MOTOR VEHICLE, PARTICULARLY A DOOR FOR A MOTOR VEHICLE

CROSS REFERENCE TO RELATED APPLICATIONS

This application claims priority to European Patent Application No. 15200225.9 filed on Dec. 15, 2015, the entire disclosure of which is incorporated herein by reference.

FIELD OF THE INVENTION

The present invention relates to bodywork or chassis components for a motor vehicle made of metal sheet, particularly a door for a motor vehicle. More in detail, and without this constituting any limitation whatsoever, the invention has been developed with particular reference to a door for a motor vehicle made of aluminum sheet.

PRIOR ART AND GENERAL TECHNICAL PROBLEM

The state of the art relevant to bodywork or chassis components for a motor vehicle made by joining two formed metal sheets makes available generally two types of technical solutions.

A first technical solution envisages joining the sheets by way of the so-called "hemming joining", that is, a method wherein a first metal sheet, typically an outer sheet or a skin sheet for the doors, is folded back to pinch a second sheet, typically an inner sheet or a frame sheet for a door. More in detail, the first and the second sheets are superimposed according to the design of the component and the first sheet is shaped so as to obtain a connection flange starting from a perimeter portion thereof, particularly by folding back the aforesaid portion until it pinches the second sheet. In correspondence of the contact surfaces between the second sheet and folded back portion it is applied a structural adhesive that is cured in loco. Subsequently, the method moves on with the welding of the folded back flange of the first sheet to the second sheet. Last, an adhesive bead is applied at the interface between the edge of the folded back flange and the second sheet to prevent the leakage of humidity and the trigger of galvanic corrosion phenomena of the sheets owing to the fact that the electroplating bath does not penetrate inside the folded back flange.

Said solution is very costly in that it requires a dedicated processing of the sheets upon the assembly thereof, and it is furthermore costly insofar as it requires using adhesive and sealant with corresponding equipments (doubled for the adhesive: application and curing). Furthermore, dimensional stability of such solution is not excellent because a constraint pattern is defined between the two sheets that is strongly hyperstatic, with consequent risk of distorsion of the sheets following welding on account of the aforesaid hyperstaticity. A second solution consist in shaping the first sheet by folding back a perimeter edge to form a connection flange that defines an open valley, thus having a gap greater than a capillary gap. The second sheet is thus welded to the connection flange, particularly with a butt welding.

The prior art offer in this regard at least two examples in documents EP 0 722 807 B1 and EP 1 952 933 B1 both showing solutions without hemming joints wherein the use of sealant and structural adhesive is not required.

The solution subject of the first document envisages a butt welding of the two sheets, that is the joining of the second sheet to the connection flange of the first sheet is provided on the edge of each of the sheets.

This can be achieved only at the cost of remarkable technological difficulties, the cost of which outbalances the saving deriving from the absence of adhesive and sealant and the lack of adhesive and the sealant application. Furthermore, the solution in point is scarcely stable from a dimensional point of view owing to the nature of the coupling between the sheets, and can be furthermore subject to deviations with respect to the geometry prescribed by design specifications during processing following the welding.

The solution being the subject of the second document envisages a butt welding of the second sheet on the outer side of the connection flange of the first sheet, wherein furthermore the second sheet is arranged incident to the first sheet.

Such a solution is less complex from the technological point of view, but it is likewise poorly stable from a dimensional point of view insofar as the welding of the two sheets in an incident position to one another provides a natural trigger for the formation of hinge between the sheets themselves, which compromises the maintenance of the design specification geometry during the subsequent processing.

OBJECT OF THE INVENTION

The object of the present invention is to solve the technical problems mentioned in the foregoing. Particularly, the object of the invention is to provide a bodywork or chassis component for a motor vehicle which is made by welding of a first and a second sheets that does not require using adhesive and sealant, which is at the same time capable of stably maintaining the design specification geometry even after joining of the sheets and that furthermore results convenient in terms of production costs.

SUMMARY OF THE INVENTION

The object of the invention is achieved by a bodywork or chassis component for a motor vehicle including a first sheet having a first connection flange and the second sheet having a second connection flange, said first sheet and said second sheet being join in correspondence of the respective first connection flange and second connection flange, wherein:

the first connection flange is a flange folded back towards the first sheet so as to define a valley with the first sheet, the second connection flange is overlapped to the first connection flange for an overlapped length and it is at least in part joint to said first connection flange by means of a welding that joins a perimeter edge of the second connection flange to the side of the first connection flange which is external with respect to said valley, and wherein the first connection flange and the second connection flange are parallel to one another in correspondence of the overlap length.

It is furthermore defined according to the invention a method for manufacturing the aforementioned component.

BRIEF DESCRIPTION OF THE FIGURES

The invention will now be described with reference to the attached figures, provided purely by way of non limiting example, wherein:

FIG. 5 is a sectional view according to line V-V of FIG. 1, while

DETAILED DESCRIPTION

Figure 1:
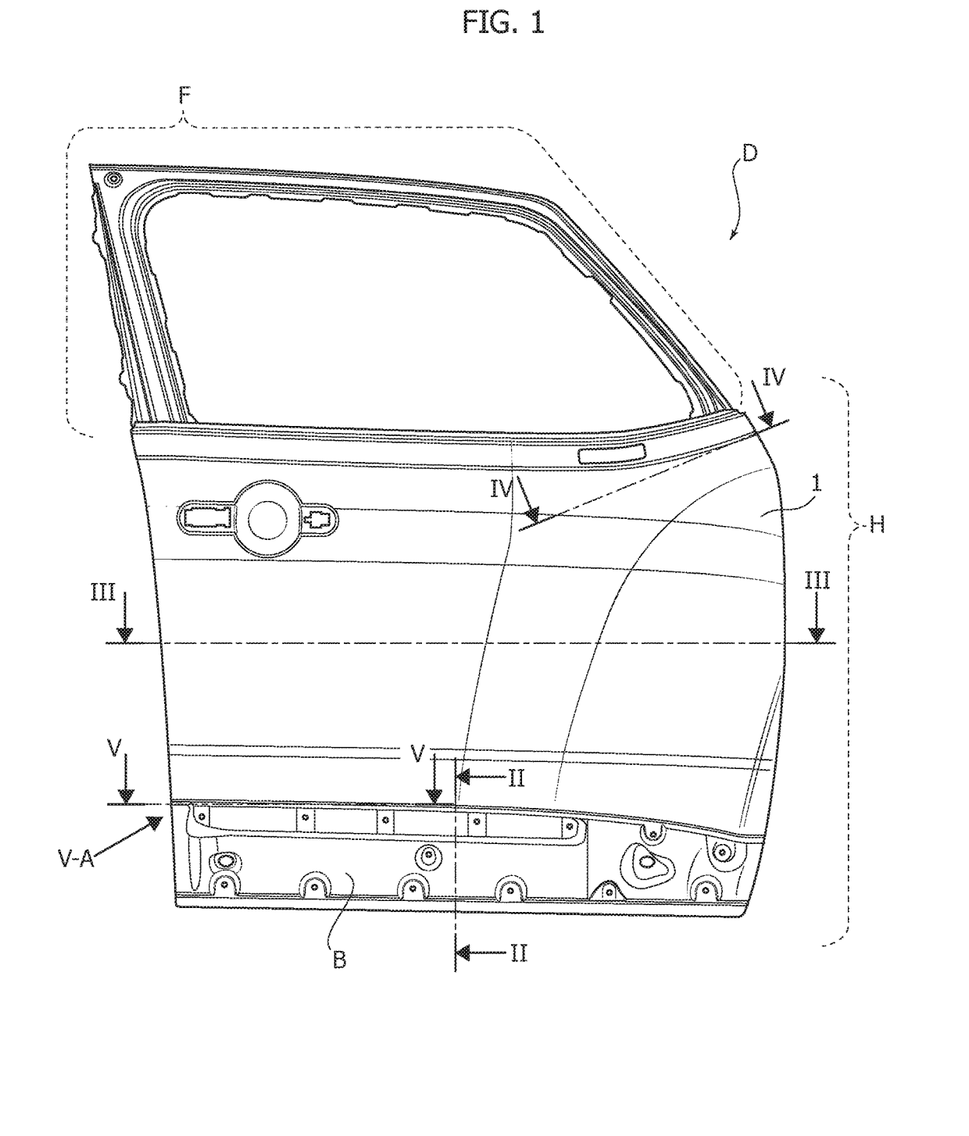
FIG. 1 is a front view of a bodywork or chassis component according to the invention, particularly a door for a motor vehicle.

Reference D in FIG. 1 indicates as a whole a bodywork component for a motor vehicle according to a preferred embodiment of the invention. Particularly, the reference D designates as a whole a door for a motor vehicle made by joining a first sheet 1 and a second sheet 2, wherein the sheet 1 is a skin sheet while the sheet 2 is a frame sheet, with a structural function. Particularly, the sheet 2 provides a load bearing frame for the door D, comprising in particular a hinge area H, a panel area B, and a frame area F, wherein the sheet 1 is superimposed to the sheet 2 substantially in correspondence of the panel area.

With reference to FIGS. 2 to 5, the first sheet 1 and the second sheet 2 include, respectively a first connection flange 3 and a second connection flange 4 which are joined by means of welding (W in the figures) right in correspondence of the respective connection flanges.

The first connection flange 3 is a flange folded back towards the first sheet 1 so as to define an open valley 5. In other words, the first connection flange 3 is folded back towards the first sheet 1 itself so as to provide a valley 5 whose width is greater than that of a capillary gap (that is, a condition of near-contact). This allows referring to an inner surface 1IN and an outer surface 1OUT of the first sheet 1. The reference that determines the characterization of the surfaces as belonging to the one or the other category (outer/inner) depends on the final position of the surfaces with respect to the geometry of the component, particularly a surface will be defined as inner when it faces towards the spatial region comprised between the two sheets 1 and 2, and a surface will be defined as a outer when it faces the opposite direction.

Numerically, the angle comprised between the walls of the valley 5, identified with α5, is comprised between 2° and 90°, preferably between 15° and 20°. This corresponds to a folding back angle—that is an angle comprised between the surface 1IN or 1OUT on the flange 3 and the same surface on the remainder of the sheet 1—comprised between 178° and 90°, preferably 165° and 160°.

As far as a sheet 2 is concerned, the second connection flange 4 is arranged parallel and overlapping the first connection flange 3 in correspondence of an overlap length indicating by the letter L. This means that the angle comprised between the connection flanges 3 and 4 is substantially equal to 0°.

The second connection flange 4 is joined to the connection flange 3 by means of a welding W which joins a perimeter edge E2 of the first sheet 2 arranged in correspondence of the connection flange 4 with an outer side of the connection flange 3 which is part of the surface 1OUT, that is, an outer side with respect to the valley 5. The welding W is preferably a laser welding. When the sheets 1 and 2 are aluminum sheets, a preferred embodiment envisages providing the welding W as a proximity laser welding with filler material.

It should be noted that the valley 5 is intrinsically arranged astride of the spatial region wherein the two sheets face, so that in the area of the connection flanges, the characterization "outer" or "inner" referred to the surfaces of the sheets may also have as a reference the valley 5 itself. On the basis of the same criteria, an inner surface 2IN and an outer surface 2OUT may be defined for the sheet 2, wherein in correspondence of the overlap length L the surfaces 1OUT and 2IN face one another. Depending on the embodiments, in correspondence of the overlap length a contact may occur between the flanges 3 and 4 or a condition of parallelism with a gap substantially akin to that of a capillary gap.

Figure 2:
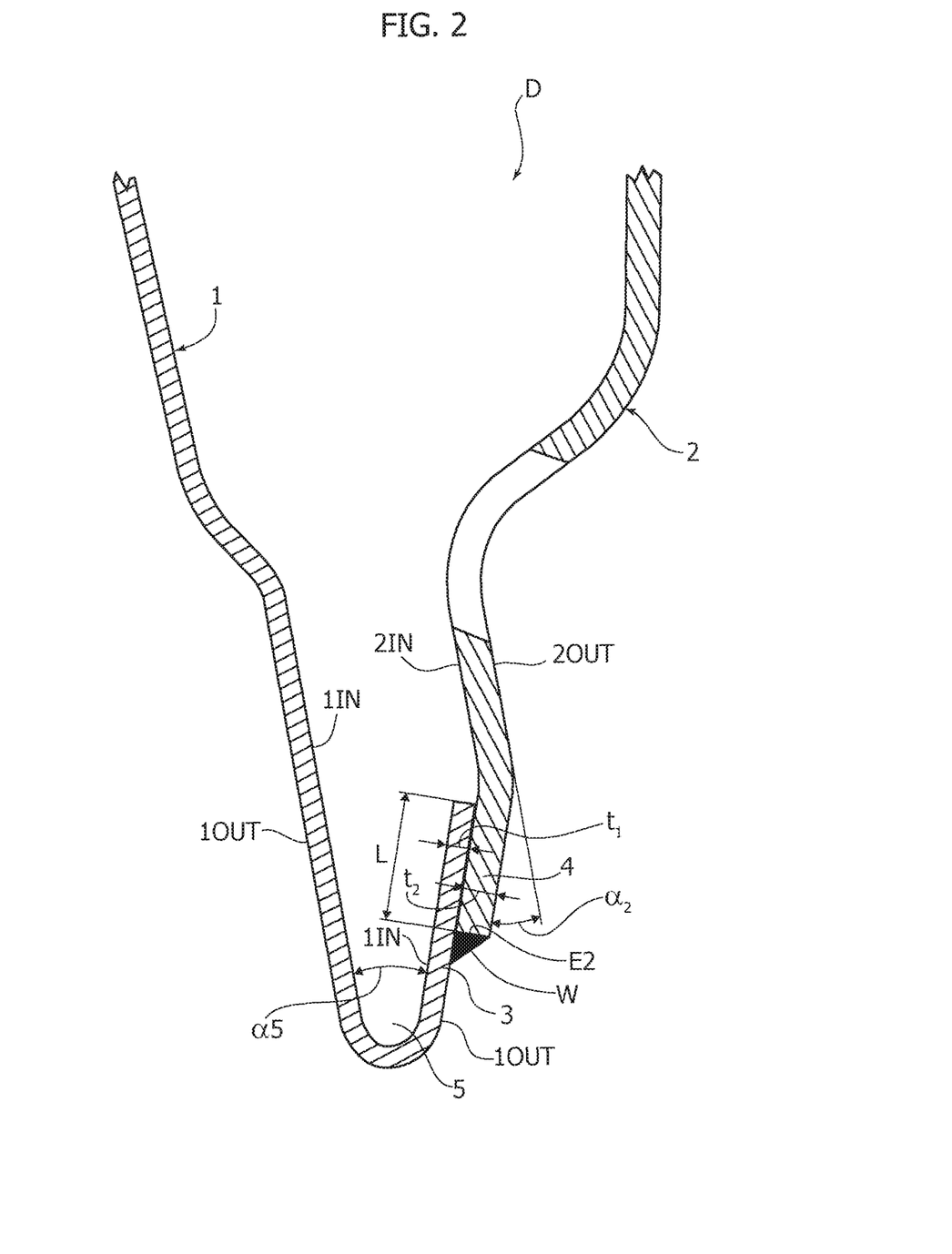
FIG. 2 is a sectional view according to line II-II of FIG. 1.
Figure 3:
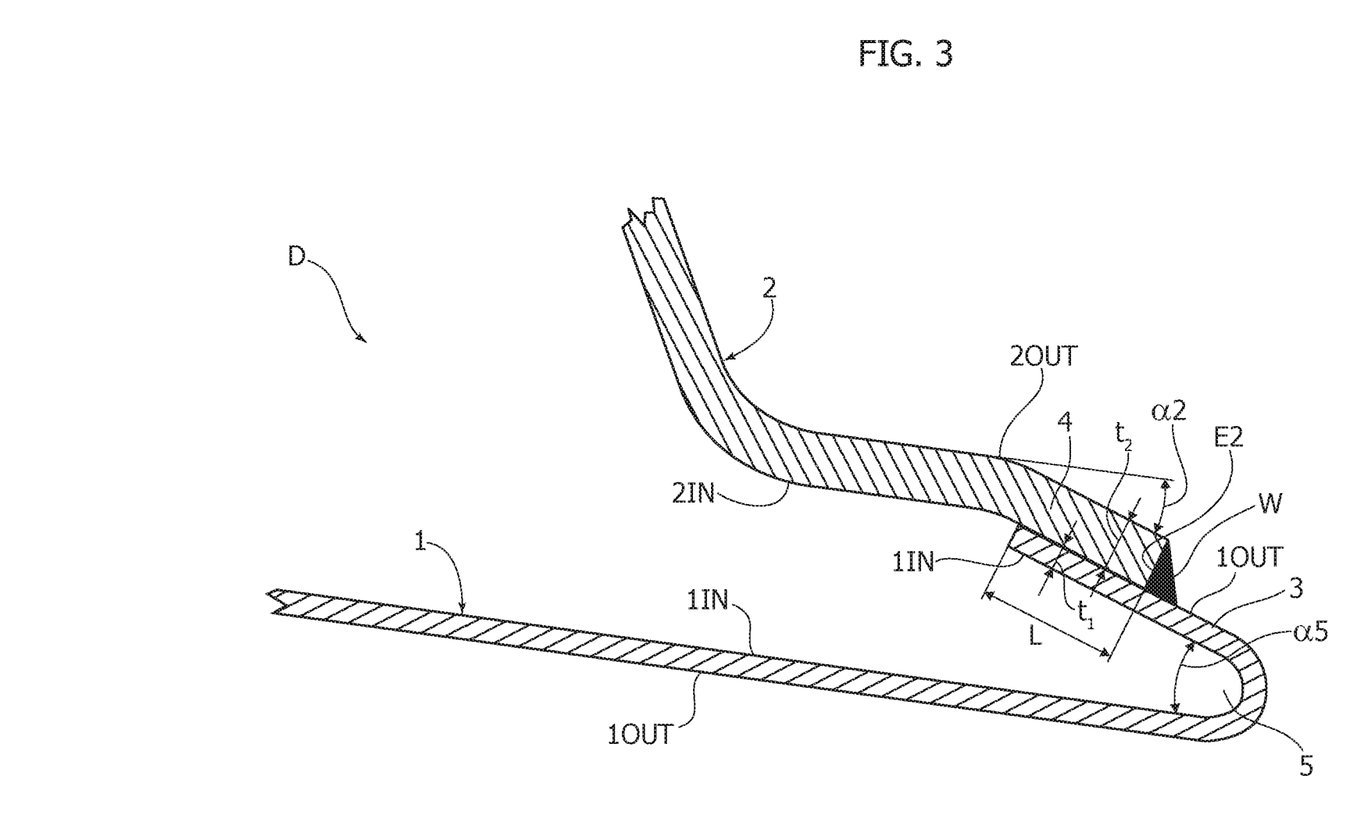
FIG. 3 is a sectional view along line of FIG. 1.
Figure 4:
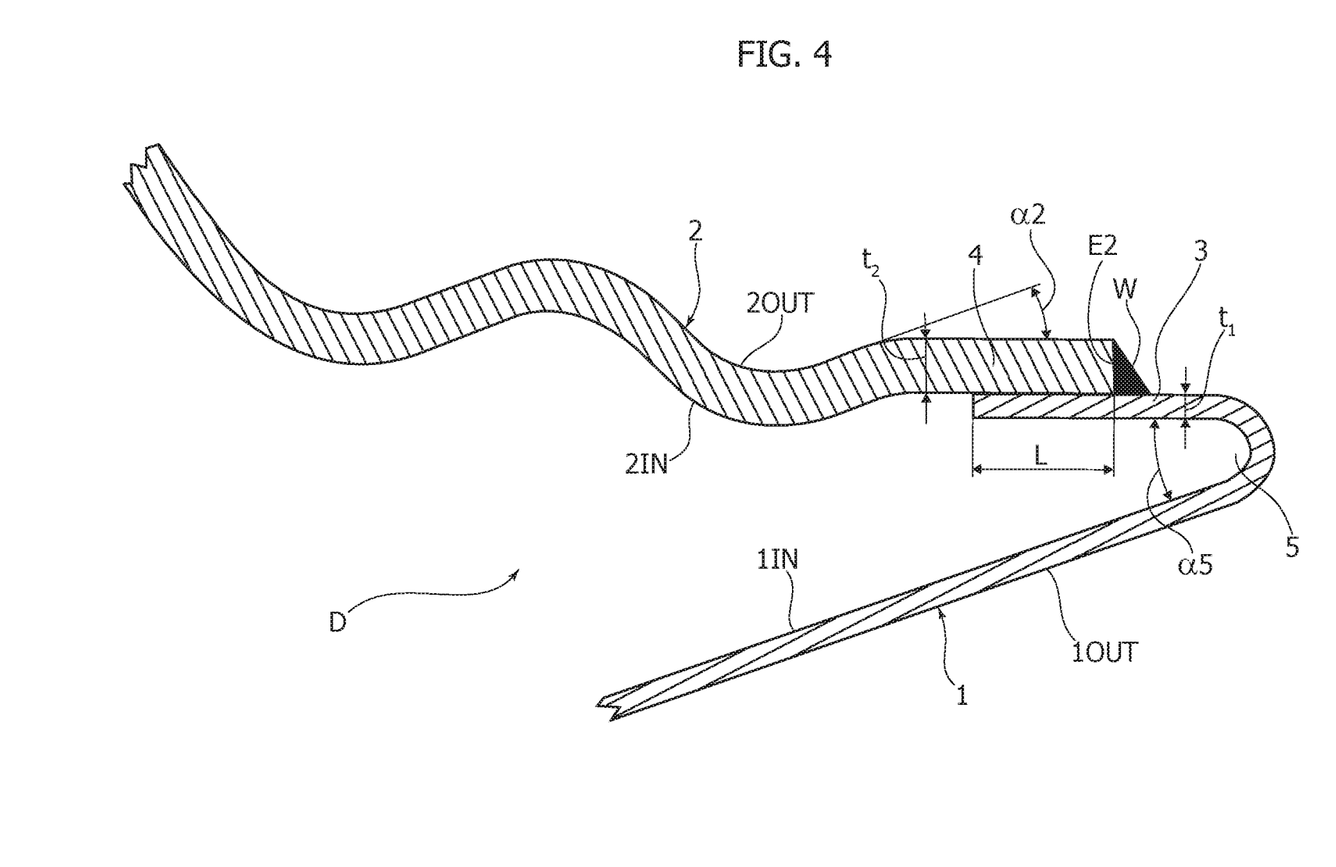
FIG. 4 is a section according to line IV-IV of FIG. 1, with FIG. 4A illustrating a possible variant of the section in correspondence of said line.
Figure 5:
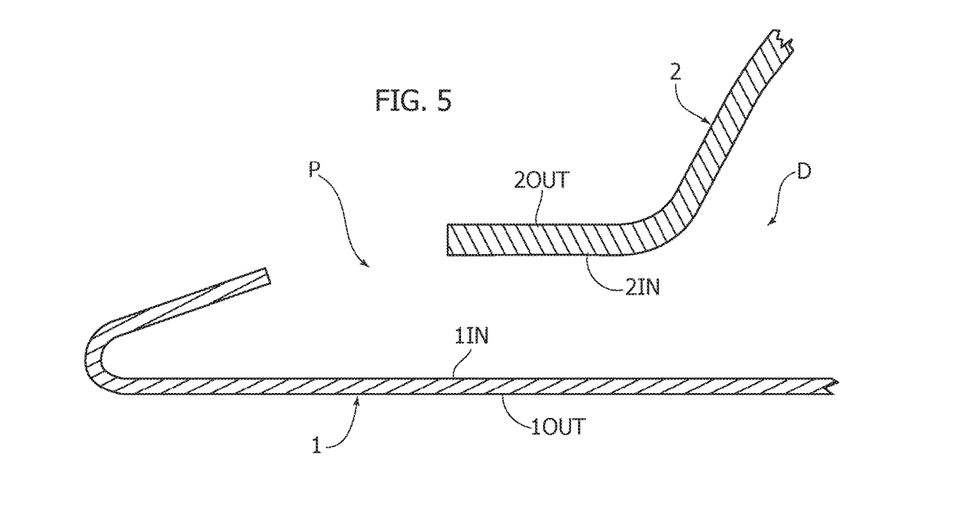

The parallelism condition of the flanges 3 and 4 over the overlap length L is achieved in several sections of the door D, for example:

with reference to FIG. 2, in a door section facing a sill of the chassis, with reference to FIG. 3, a door section proximate to the hinge area H, with reference to FIG. 4, a door section at the bottom of the frame area and in a position corresponding to the front pillar on the chassis, with reference to FIG. 5, a longitudinal section substantially intermediate with respect to the panel area B.

Preferably, with reference to FIGS. 2, 3, 4, 4A, the flange 4 is made—similarly to the flange 3—by way of localized folding of a peripheral portion of the second sheet 2. However, the folding does not cover the same excursion that characterizes the flange 3, in so far as the surface (2IN or 2OUT, identically) of the flange is inclined by an acute angle $\alpha 2$ generally comprised between 0° and 15° with respect to the same surface (2IN or 2OUT) of the remainder of the sheet 2.

Figure 4A:
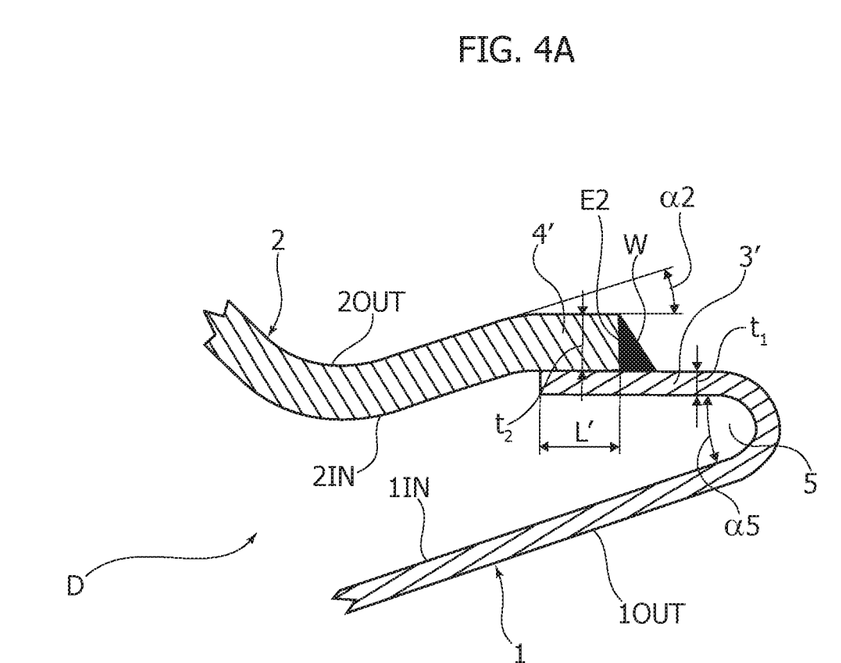

FIGS. 4 and 4A illustrate how the overlap length L may be varied depending on the requirements, for example the design structural load, the sheet thickness (reference t1 for the sheet 1, t2 for the sheet 2) and so on.

Specifically, FIG. 4 shows a condition wherein the overlap length, therein indicated by reference L', is lower than the overlap length L of FIG. 4.

In this regard, the inventors have observed that in order to ensure the best dimensional stability with respect to the loads imparted after welding, in correspondence of the overlap area between the sheets the three parameters L, t1 and t2 may be linked to each other by the following relationships:

$$L=[2\cdot(t2/t1)] \text{ mm if } 1.5 \leq t2/t1 < 2.5$$

$$L=\max[(t2/t1) \text{ mm; 3 mm}] \text{ if } t2/t1 \geq 2.5$$

wherein typical thickness figures are considered that correspond to $0.7 \leq t2 \leq 2$ and $0.5 \leq t1 \leq 1.5$ with $t1 < t2$.

Furthermore, in order to guarantee a sufficient dimensional stability of the door D in every condition, the overlap length L is chosen preferably equal or greater than 3 mm.

As far as the welding method of the sheets 1 and 2 is concerned, the latter envisages that the connection flanges 3 and 4 be not parallel to each other in correspondence of the overlap length L, but be arranged incident by a very small angle, typically 3° or 4°, to be subsequently forced into the parallel condition during the formation of the welded joint.

The flange 3 is, to this end, preferably folded back so as to identify an angle α5 slightly greater than the value according to design specifications (for example, if the value according to design specification is equal to 20°, the angle imparted preliminarily to the welding is about 2°-3° greater).

Upon the formation of the welded joint a force is applied, preferably via the welding equipment, that causes the closure of the flange 4 on the flange 3 (with nullification of the angle of incidence therebetween which has been imparted during the step preliminary to the execution of the joint), and that furthermore brings the value of the angle α5 to that according to design specifications, nullifying the excess imparted preliminary to the formation of the welded joint.

The clamping blocks of the welding equipment shall be to this end arranged in a position sufficiently close to the position of the welding bead so as to be in a condition to exert an action needed for imparting the final geometry to the welding joint.

More in detail, for the manufacturing of the door D (or in general any bodywork or chassis component for a motor vehicle) a method is implemented which comprises the steps of:

providing the first sheet with the connection flange 3,
providing the second sheet with the second flange 4,
bringing the second connection flange 4 into contact with the first connection flange 3 so as to define an acute angle of incidence therebetween, the contact occurring on a side of the first connection flange 3 external to the valley 5,
displacing at least one of said first connection flange 3 and second connection flange 4, preferably the flange 4, so as to impart an overlap and parallelism condition therebetween in correspondence of the overlap length L, and
providing the welding W joining the perimeter edge E2 to the outer side 1OUT of the first connection flange 3.

The person skilled in the art will thus appreciate that the solution shown in the present description allows eliminating all the drawbacks of the known solutions, both those featuring a hemming joint and subsequent welding, and those without a hemming joint, but having a welded joint on connection flanges, thanks to the parallel arrangement of the connection flanges in correspondence of the overlap length.

Compared to the solutions featuring a hemming joint, the invention allows eliminating the sealing facilities inside the manufacturing plant, and accordingly all the operations related to the sealing itself, with subsequent savings in terms of investments, production times and labour.

It is furthermore possible to eliminate the structural adhesive stocks, the equipment for dispensing the adhesive and subsequent operation of induction curing of the adhesive itself, as well as all the activities related to the supply logistics.

Furthermore, with respect to the solutions featuring a hemming joint, dimensional stability is anyway increased insofar as strongly hyperstatic configurations are avoided which are typical of the hemming joining process, with subsequent reduction of the risk of distorsion of the sheets after welding owing to the aforementioned hyperstaticity.

Compared to the solutions without a hemming joint, but featuring the sole welding on connection flanges, dimensional stability is remarkably increased insofar as the parallelism and the contact or near-contact between the flanges 3 and 4 allows to best bear the stresses acting on the door after welding, because the possibility of formation of a hinge in correspondence of the welding itself is prevented, which instead constitutes the main drawback of the solution known from EP 1 952 933 B1.

Figure 5A:
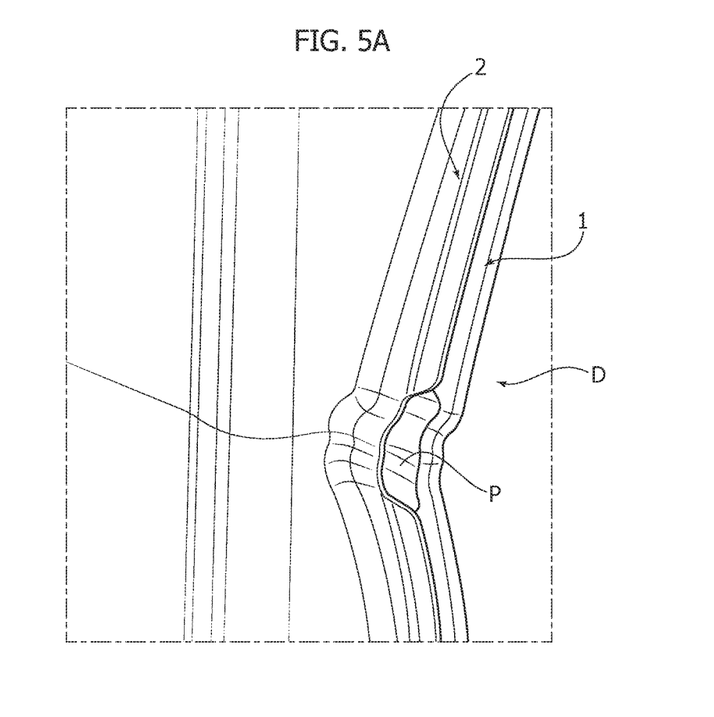
FIG. 5A is a perspective view according to line V-A of FIG. 1 that illustrates the sheets of the component in correspondence of the same section.

The solution according to the invention can be furthermore implemented in every point of the door D, and is perfectly compatible with the provision of moisture drainage points P as illustrated in FIGS. 5 and 5A. In correspondence of the drainage point P the welding bead W is absent and the connection flange of each sheet is also interrupted (or at best the flange of the sheet 2) so as to open a passageway that provides the drainage P.

Furthermore, the solution according to the invention can be adapted to a plurality of bodywork or chassis components for a motor vehicle wherein the joining of two superimposed sheets is required, for example pillars, spars, structural reinforcement, domes for motor vehicle suspensions and so on.

Last the solution according to the invention turns out to be particularly advantageous, specially for a door D, insofar as it easily allows to use metal sheets already being part of normal production items. This is particularly true in respect of the sheet 2, which may be obtained simply by folding the edge of a pre-existing sheets to form the flange 4. This owing to the fact that the parallelism and the contact or near-contact condition between the flanges 3 and 4 creates a small variation in the relative position of the sheets 1 and 2 in case the latter are joined by means of a hemming joint and subsequent welding.

On the contrary, a solution such as that described in EP 1 952 933 B1 is susceptible of introducing an appreciable variation of the relative position of the sheets 3 and 4 insofar as the angle of incidence of the second sheet with respect to the folded back flange ? to the angle between the folded back flange and corresponding sheet, thereby making it impossible to use pre-existing metal sheets without massive modifications.

Contrary to the solution according to the invention, the slide folding that preferably is provided in correspondence of the perimeter edge of the second sheet compensates for the effects on the relative position of the sheets 1 and 2 due to the angle α5.

Of course, the constructional details and the embodiments may be widely vary with respect to what described and shown herein, without by this departing from the scope of the present invention, as defined by the appended claims.

What is claimed is:

1. A bodywork or chassis component for a motor vehicle including a first sheet having a first connection flange and a second sheet having a second connection flange, said first sheet and said second sheet being joined in correspondence of the respective first connection flange and second connection flange, wherein:

the first connection flange is a flange folded back towards the first sheet so as to define a valley with the first sheet,
the second connection flange overlaps the first connection flange over an overlap length and is at least in part joined to said first connection flange by a welding that joins a perimeter edge of the second connection flange to a side of the first connection flange external with respect to said valley, and
wherein the first connection flange and the second connection flange are parallel to one another in correspondence of the overlap length,
wherein said first sheet has a first thickness, said second sheet has a second thickness, wherein in correspondence of said overlap length said first thickness and second thickness are linked to said overlap length by the following relationships:

$$L=[2 \cdot (t2/t1)] \text{ mm if } 1.5 \leq t2/t1 < 2.5$$

$$L=\max[(t2/t1) \text{ mm}; 3 \text{ mm}] \text{ if } t2/t1 \geq 2.5$$

wherein furthermore $0.7 \leq t2 \leq 2$ and $0.5 \leq t1 \leq 1.5$, with $t1 < t2$.

2. The component according to claim 1, wherein the first connection flange and the second connection flange are in contact to one another over the overlap length.

3. The component according to claim 1, wherein the first connection flange is folded back to define said valley so that an amplitude of said valley is higher than that of a capillary gap.

4. The component according to claim 1, wherein the first connection flange defines with the first sheet an angle comprised between 2° and 90°.

5. The component according to claim 1, wherein said second connection flange is made by folding of a perimeter portion of said second sheet by an angle comprised between 0° and 15°.

6. The component according to claim 1, wherein said first sheet and said second sheet are aluminum sheets, and said welding is a proximity laser welding performed with filler material.

7. The component according to claim 1, wherein the first connection flange defines with the first sheet an angle comprised between 15° and 20°.

8. A method for manufacturing a component for a motor vehicle including a first sheet having a first connection flange and a second sheet having a second connection flange, the method comprising the steps of:
  providing the first sheet with the first connection flange with said first connection flange being folded back towards said first sheet to form a valley,
  bringing said second connection flange into contact with said first connection flange so as to define an acute angle of incidence therebetween, said contact occurring on a side of the first connection flange external to said valley,
  displacing at least one of said first connection flange and said second connection flange so as to impart an overlap and a parallelism condition therebetween in correspondence of an overlap length, and
  providing a welding joining a perimeter edge of said second connection flange to an external side of the first connection flange, said first sheet and said second sheet being joined in correspondence of the respective first connection flange and second connection flange,
  wherein said first sheet has a first thickness, said second sheet has a second thickness, wherein in correspondence of said overlap length said first thickness and second thickness are linked to said overlap length by the following relationships:

$L=[2 \cdot (t2/t1)]$ mm if $1.5 \leq t2/t1 < 2.5$ $L=\max[(t2/t1) \text{ mm}; 3 \text{ mm}]$ if $t2/t1 \geq 2.5$ wherein furthermore $0.7 \leq t2 \leq 2$ and $0.5 \leq t1 \leq 1.5$, with $t1 < t2$.

9. The method according to claim 8, wherein said displacing at least one of said first connection flange and the second connection flange includes displacing said second connection flange.

* * * * *